United States Patent

Dolegowski

[15] 3,680,661
[45] Aug. 1, 1972

[54] LUBRICATOR AND SENSOR VALVE THEREFOR

[72] Inventor: Arthur R. Dolegowski, Littleton, Colo.

[73] Assignee: C. A. Norgren Co., Littleton, Colo.

[22] Filed: Oct. 6, 1970

[21] Appl. No.: 78,352

[52] U.S. Cl. .................................. 184/55 A, 137/525
[51] Int. Cl. .............................................. F16n 7/34
[58] Field of Search ....... 184/55 R, 55 A, 56 R, 56 A; 137/525

[56] References Cited

UNITED STATES PATENTS 3,131,786  5/1964  Gleason et al. ............. 184/55 A
2,936,779  5/1960  Kindred ........................ 137/525
3,540,551  11/1970  Ohshida ......................... 184/56
3,450,229  6/1969  Moore et al. ................. 184/55 A Primary Examiner—Manuel A. Antonakas
Attorney—Sheridan, Ross & Burton

[57] ABSTRACT

A lubricator for adding oil to an air stream characterized by a generally disc-shaped air flow sensor valve disposed in the air stream adapted to increasingly open with increased rate of air flow, further characterized by an annular convolution or fold in the disc-like member which serves as a loading spring for radially urging the periphery of the valve toward closed position.

10 Claims, 6 Drawing Figures

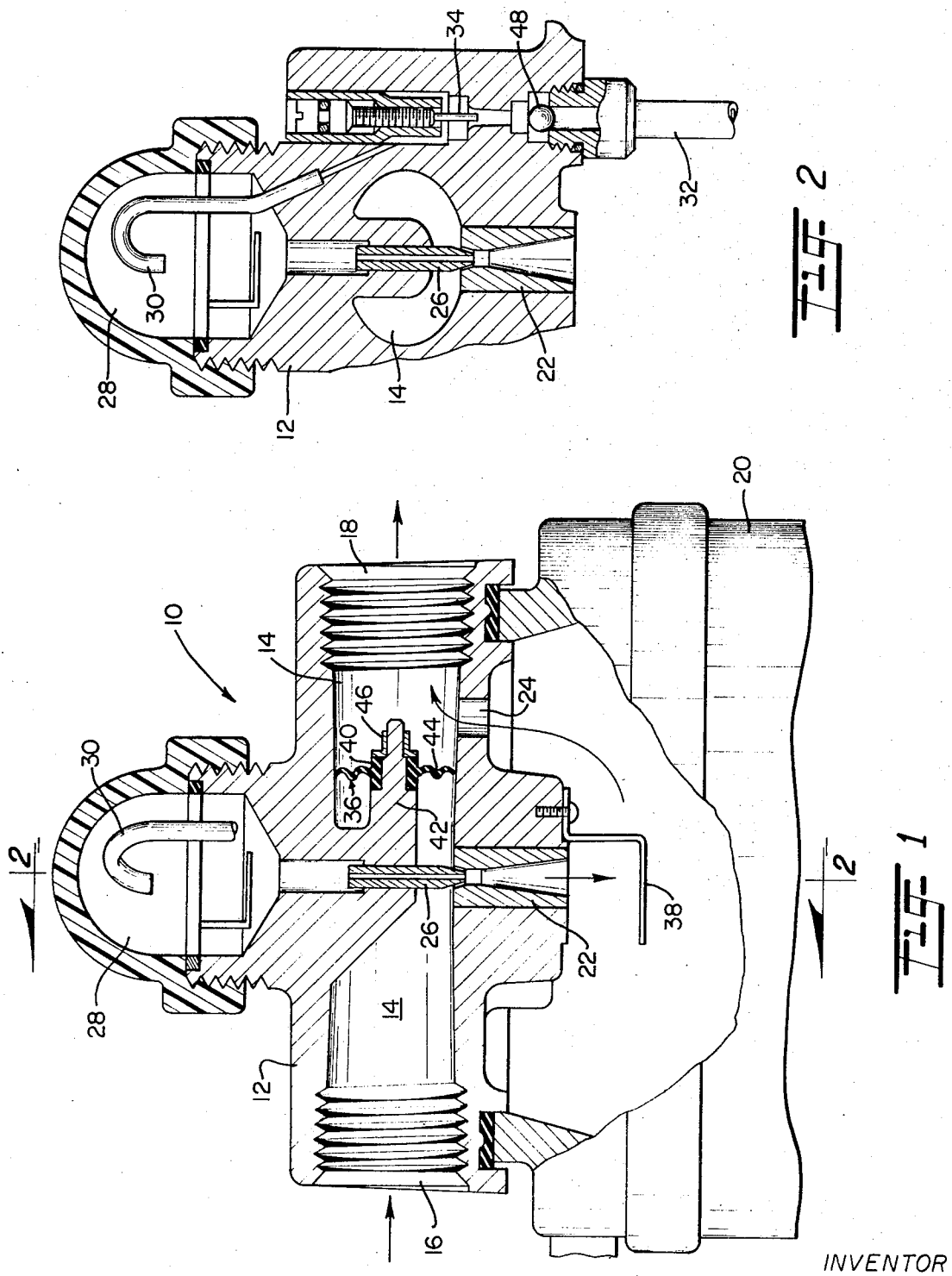

INVENTOR
ARTHUR R. DOLEGOWSKI
BY Sheridan, Ross & Burton
ATTORNEYS

LUBRICATOR AND SENSOR VALVE THEREFOR

BACKGROUND OF THE INVENTION

In the art of providing lubrication for air operated devices, it has long been the practice to admit lubricant, such as oil, into an air supply conduit in the form of finely divided particles, which are delivered to the device, which may be a tool, power actuator or the like. Since the air consumption of the device, or several devices serviced by the lubricator, may vary between wide limits it is desired that the lubricant be admitted to the air stream so that it is in a desired proportion to the quantity of air flow. In one form of prior art device, as exemplified by U. S. Pat. No. 3,368,645 to Hoffman et al., a resilient circular diaphragm is disposed between the air inlet and outlet of the lubricator, its outer edge being fixed to the lubricator body and its central portion being provided with an aperture which opens to varying degree with increase in air flow, providing an annular air stream of varying size into which oil is metered. This is generally known as an oil fog lubricator since all of the metered oil is delivered to the lubricator outlet.

In another form of lubricator, generally known as the micro-fog type, as exemplified by U. S. Pat. No. 2,747,688 to Faust, the metered oil is delivered to bypass air which enters the top of the oil reservoir where the larger particles of oil are separated and returned to the oil supply, the finer particles passing out of the bowl and joining the remaining unbypassed air.

SUMMARY OF THE INVENTION

As illustrated, the present invention is analogous to features of the prior art referred to in that a flow sensor or valve is employed, as in the Hoffman patent, but differs in that it is of the micro-fog type as in Faust. It differs from Faust, however, in that metered oil is controlled by a metering valve disposed in the oil supply line, similar to that disclosed in the Hoffman patent (e.g. FIG. 4). The principal difference from either of the patents resides in the flow sensor or diaphragm valve which is centrally fixed to the lubricator body, its outer portion being free to flex to form an annular air flow stream therearound of variable area and which may be employed in either an oil fog or micro-fog type lubricator. More importantly, it is provided with at least one annular convolution between its central portion and its periphery which serves as a spring for loading the periphery in all radially outward directions. As a result of this loading, the hysteresis curve of pressure drop vs. flow rate, during opening and closing of the sensor valve, is such that opening and closing occur at substantially the same flow rate whereas with a flat diaphragm, as in the Hoffman patent, the opening and closing occur at different flow rates. Otherwise stated, the convoluted diaphragm, as compared with a flat diaphragm, provides improved "memory" to return to its original position after being flexed and when flow rate decays to a small value. The flexure is bi-directional and substantially the same upon reverse flow of air through the lubricator.

The principal object of the invention is, accordingly, the provision of a lubricator having a diaphragm sensor valve which provides novel resilient loading thereon and effects improved air-oil ratios, particularly at low air flow rates where such ratios are the most critical for optimum lubrication of an air operated device and which may be employed in an oil fog or micro-fog type lubricator.

Another object is to provide a lubricator having a sensor valve in which the resilient loading is effected by at least one annular convolution therein which is of generally bellows or accordian-like cross section.

A further object is to provide a lubricator having a sensor valve in which the resilient loading is effected by at least one annular convolution therein which is preferably of generally sinusoidal cross section.

A further object is to provide a lubricator having a sensor valve in accordance with the foregoing objects, the lubricator being of the micro-fog type in which larger oil particles delivered to by-pass air around the valve are returned to an oil supply reservoir.

Further objects, advantages, and salient features will become more apparent from the detailed description to follow, the appended claims, and the accompanying drawing to now be briefly described.

BRIEF DESCRIPTION OF THE DRAWING

FIG. 1 is a side elevation of the upper portion of the subject of the invention, portions being shown in section;

FIG. 2 is a section taken on line 2—2, FIG. 1;

DESCRIPTION OF PREFERRED EMBODIMENT

Figure 3:
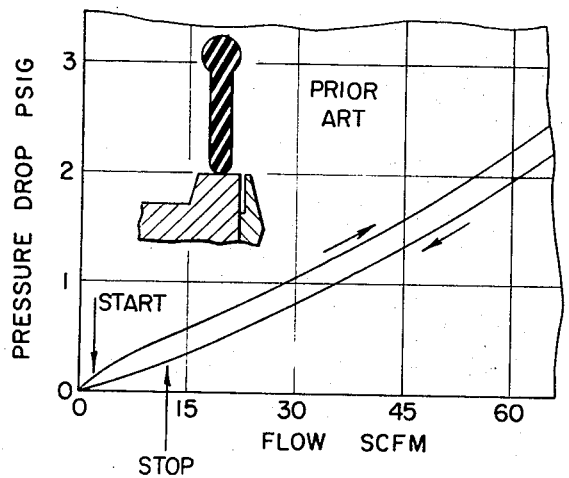
FIG. 3 is a partial performance chart of a prior art valve.

Referring now to the drawing, and first to FIGS. 1 and 2, lubricator 10 comprises a body member 12 having an air passageway 14 with an inlet end 16 and an outlet end 18. An oil reservoir or bowl 20 is secured to the body member and contains the oil to be added to the air stream. A venturi 22 communicates the space above the oil in the reservoir with passageway 14 and an aperture 24 communicates such space with the passageway 14 at a point downstream from the venturi. An oil delivery tube 26 terminates within the mouth or convergent cone of the venturi, tube 26 communicating with dome 28. A drip tube 30 communicates with a dip tube 32, the lower end of which terminates near the bottom of the reservoir, and an adjustable metering valve 34 is disposed between the drip tube and dip tube for controlling flow of oil to the oil dome and thence to delivery tube 26. A diaphragm valve 36, to be subsequently described in more detail, is disposed in passageway 14, between venturi 22 and outlet 18 which may open to varying degree dependent upon the rate of air flow through the lubricator.

In the operation of the construction so far described, air enters inlet 16 and a portion of same opens valve 36 and flows to outlet 18. Another portion flows through venturi 22, where oil is added from tube 26. The oil-air mixture thence flows into the top of the reservoir and impinges on baffle 38, which effects a change of flow direction, separating heavy particles of oil from the air-oil mixture. The remainder, which is now micro-fog previously alluded to, flows through aperture 24 and joins the air passing around valve 36.

Figure 4:
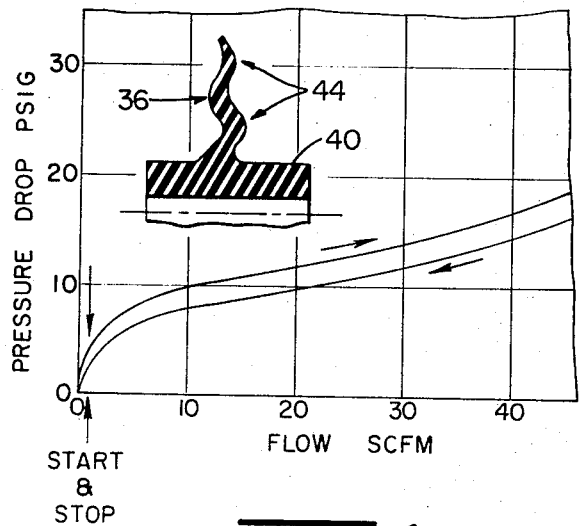
FIG. 4 is a like chart of the subject of the invention.

Referring now to FIGS. 1 and 4, sensor or diaphragm valve 36 is provided with a central hub portion 40, having an aperture which engages a support 42 disposed centrally of air passageway 14. Its periphery is circular and its cross-section between the hub and periphery is generally sinusoidal to provide at least one annular convolution 44 which serves as a spring for resiliently loading its periphery in all radial directions.

Figure 6:
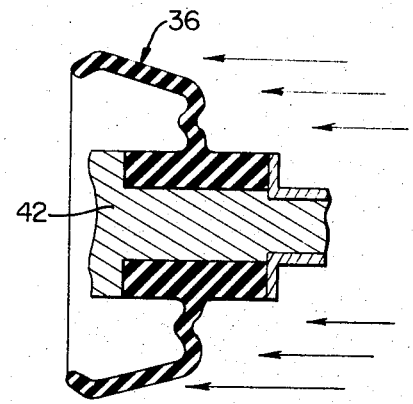
FIG. 6 is a like section during reverse air flow.
Figure 5:
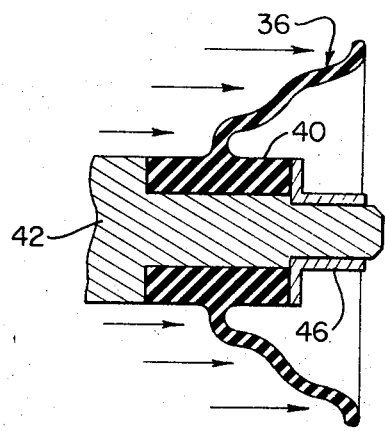
FIG. 5 is a section through the valve during one condition of forward air flow.

FIGS. 1 and 4 illustrate the shape of the valve during a condition of no air flow through the lubricator. FIG. 5 illustrates a condition of air flow from the inlet to the outlet and FIG. 6 illustrates a condition of reverse flow, that is, from the normal outlet to the normal inlet. As will be apparent from FIGS. 5 and 6 the valve assumes a generally frusto-conical shape and its periphery forms a variable width annular channel through which air flows. At high rates of air flow when the periphery of the valve is spaced from the bore the annular channel just referred to is of substantially uniform width. At very low air flow, however, portions of the periphery separate from the bore and others remain in contact therewith. The periphery thus flexes to a scalloped or serpentine shape with several scallops (of the order of five or six) thereabout, the scallops forming angularly spaced air passages. As these scallops enlarge with increased air flow, the entire periphery separates from the bore and the air passage becomes a substantially continuous annulus as illustrated in FIG. 5.

In addition to the difference of operative characteristics, as illustrated by the comparative charts of FIGS. 3 and 4, a further advantage of the present invention, over the flat valve of FIG. 3, resides in reduction of manufacturing costs by reason of allowing greater tolerances. In the construction of FIG. 3, the central projection which cooperates with the centrally apertured flat valve must be precisely concentric with the bore; otherwise, the central aperture will not seat with uniform pressure about the periphery of the projection. In the present invention, however, the periphery of the convoluted disc is considerably more flexible and even though it is mounted slightly eccentric on its central support, the flexibility of its periphery and the radial spring urge thereon permits the lip of the periphery to flex slightly and seat within the bore of the passageway with substantially uniform pressure. This is attained by the simple expedient of constructing the valve, when relaxed, of a diameter slightly in excess of the diameter of the bore.

Hub 40 is preferably retained on projection 42 by a press fit flanged collar 46. A ball check valve 48 is also preferably provided to prevent gravity return of oil in drip tube 30 to the reservoir when the lubricator is not in operation.

While the cross-sectional shape of the convolutions has been illustrated as generally sinusoidal, it will be apparent that other shapes may be employed within the purview of the invention, exemplary forms being of a wave shape which is rectangular, triangular, trapezoidal, or curves other than sinusoidal, which curve at all parts thereof, the essential criterion being that the cross-sectional shape be such that it provides a spring which urges the periphery radially outwardly at all parts thereof.

What is claimed is:

1. In an air line lubricator having a body with an air conduit therein with air inlet and outlet ends and an intermediate circular bore disposed therebetween, the improvements, in combination, comprising:
   a. a fixed support disposed within said conduit constructed to permit air flow between said ends,
   b. a circular elastomeric disk-like air flow sensor valve affixed at its central portion to said support, a general reference plane of the valve, during a no-flow condition, being perpendicular to the axis of the bore with the valve substantially closing the bore, said valve being so constructed to flex in either of opposite directions of air flow into generally frusto-conical shapes, forming annular channels of various areas between its periphery and said bore,
   c. said valve having a circular convolution between its central portion and its periphery adapted to serve as a spring for urging its periphery outward in all radial directions to thereby urge it in directions toward said plane as flow rate decays.

2. A lubricator in accordance with claim 1 including an oil reservoir having a space thereabove communicating with the outlet end and bypassing the sensor valve, a venturi communicating said space with said inlet end upstream from the sensor valve, whereby a portion of air supplied to the inlet end may by-pass the sensor valve, pass through the venturi into said space and rejoin the air passing through the sensor valve, a conduit communicating the oil in the reservoir with the venturi adapted to meter oil to the by-pass air, heavy oil particles therein adapted to be returned to the reservoir.

3. A lubricator in accordance with claim 2 wherein said conduit communicating the oil in the reservoir with the venturi is provided with an adjustable metering valve between its ends adapted to control the rate of flow of oil to the venturi.

4. A lubricator in accordance with claim 1 wherein the cross section of the convolution generally resembles a wave portion of a transcendental function.

5. A lubricator in accordance with claim 4 wherein the sensor valve is provided with an elongated central hub having an aperture therein telescopically engaging said support.

6. A lubricator in accordance with claim 5 including means for securing said hub to the body to prevent unauthorized removal therefrom.

7. A lubricator in accordance with claim 4 wherein the transcendental function is continuous between the central portion of the valve and the peripheral edge thereof.

8. A lubricator in accordance with claim 1 wherein said valve is so constructed that at low rates of air flow, portions of its periphery remain in contact with said bore and other portions separate therefrom, forming a scalloped peripheral edge on the valve.

9. A lubricator in accordance with claim 1 wherein the relaxed diameter of the valve is slightly greater than the diameter of the bore and its peripheral edge is sufficiently flexible to permit the entire periphery to engage the bore, during a no-flow condition, despite a slight eccentric mounting of the valve within the bore, thereby reducing manufacturing tolerances otherwise required.

10. A lubricator in accordance with claim 1 wherein an annular portion of the valve adjacent its periphery is disposed at a slight angle to said reference plane, the peripheral edge being rearwardly thereof with respect to a direction of air flow from the inlet to the outlet.

* * * * *

UNITED STATES PATENT OFFICE
CERTIFICATE OF CORRECTION

Patent No. 3,680,661                    Dated  August 1, 1972

Inventor(s)   Arthur R. Dolegowski

It is certified that error appears in the above-identified patent and that said Letters Patent are hereby corrected as shown below:

In Fig. 4, the vertical axis legend should be changed from "0  10  20  30" to --0  1  2  3--.

Signed and sealed this 29th day of May 1973.

(SEAL)
Attest:

EDWARD M. FLETCHER, JR.                ROBERT GOTTSCHALK
Attesting Officer                      Commissioner of Patents